3,556,731
AUTOMATED INCUBATION APPARATUS
Donald N. Martin, Whittier, Calif., assignor to Beckman Instruments, Inc., a corporation of California
Filed Jan. 22, 1968, Ser. No. 699,569
Int. Cl. G01n 1/00
U.S. Cl. 23—253           8 Claims

ABSTRACT OF THE DISCLOSURE

An incubator for use in automated chemical analyzer systems having the form of a serrated block of aluminum or the like, each serration or tooth being hollowed out and having an inner surface into which the outer surface of a capsule cup is adapted to fit snugly, the aluminum block containing a heater controlled by a thermoswitch and serving by contact with the capsule cup to heat liquid contained in the cup for the incubation thereof, the block being mounted for vertical movement and adapted to be brought up to engage around the cup of the capsule.

---

This application is related to application Ser. No. 699,618 filed concurrently herewith for Automated Chemical Analyzer by Jerry E. Rochte et al.

The present invention relates to apparatus for heating or incubating chemical, biological or other types of samples and more particularly to incubation apparatus for use in an automated chemical analyzer in which the sample is contained in individual capsules having a hollow body and a plurality of cups formed therein. It is often necessary in the analysis of chemical or clinical samples to apply heat thereto in order to incubate the sample and bring it to a state of development necessary in the analysis thereof.

It is therefore an object of the present invention to provide incubator appartus which is adapted to use in an automated chemical analyzer.

Another object is the provision of an incubation apparatus which is simple and economical to construct and operates in a facile manner.

A further object is to provide an incubation apparatus in which the combination of the stations thereof and the range of temperatures at which the apparatus may be maintained provides a substantial range of incubation periods so as to have utility in the incubation of a great variety of samples.

These and other objects and advantages are achieved by an incubation apparatus of the present invention which contemplates and is concerned with a massive block of aluminum formed with serrations or toothlike projections, each of which is machined out to provide a surface therein which fits snugly about a cup in a sample capsule, the block being maintained at a predetermined temperature, as by an electric heater or the like controlled by a thermoswitch.

Other objects, advantages and features of the present invention will become better understood by reference to the following detailed description when considered in connection with the accompanying drawing wherein:

FIG. 1 schematically illustrates the incubation apparatus embodying the principles of the present invention;

Figure 1:
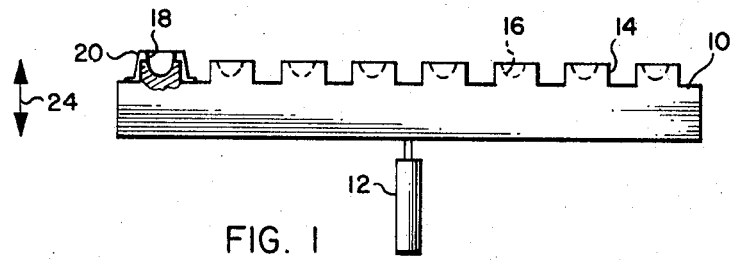
Figure 2:
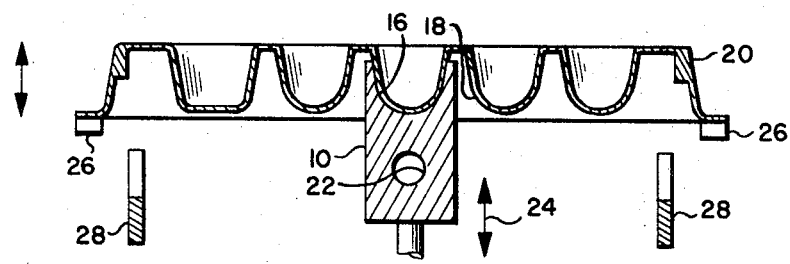
FIG. 2 is a vertical section, on a larger scale, showing the relationship of the incubation apparatus to a cup in a sample capsule.

Referring now to the drawing, there is shown in FIG. 1 a massive block 10 of suitable material, for example, aluminum or the like, which is of enlongated, serrated form conveniently coupled to a vertical air cylinder 12. Each serration or tooth like projection 14 of the block is hollowed out by precision machining to provide a recess 16 with an inner surface fiitting snugly about the outside surface of a cup 18 in the sample capsule 20 and constituties a heat exchange station. The block 10 is provided with an elongated bore 22 (FIG. 2) which receives any suitable heating means controlled to maintain the block at a predetermined temperature; for example, an electric heater controlled by a thermoswitch.

The incubation apparatus of the present invention is particularly adapted for use with the automated chemical analyzer described in the aforementioned application Ser. No. 699,618 and reference may be made thereto for a clearer understanding of the environmental use of the incubation apparatus and its relation to the other components of the analyzer.

Thus, in the use of the incubation apparatus, the temperature controlled block 10 is vertically reciprocated, as indicated by the double-headed arrow 24, and is brought up under the capsule so as to engage with the cup containing the fluid to be incubated and applies heat thereto during a heat exchange dwell period, say 58 seconds out of every minute, that the block 10 is in contact with the cup in the capsule. As will be appreciated from reference to the aforementioned application Ser. No. 699,618 the capsule 20 is supported on a pair of vertically reciprocated rails 26 and moved therealong by horizontally reciprocated teeth 28, the movement of the incubator block 10 being coordinated or synchronized with that of the rails and teeth so that the capsule is moved over a toothlike projection 14 while the block is down. Thus, with each cycle the capsule is progressively moved to the next projection 14, in sequence, and the contents of the cup 18 are subjected to heating during a dwell period which constitutes the major portion of a cyclic interval. It will therefore be understood that by selecting the number of heat exchange stations, the temperatures at which they are maintained, the length of the cycle and dwell period, any desired period of incubation may be obtained. Also, with but a very brief transition time between dwell periods, substantially all of the time of each cyclic interval is devoted to heat exchange.

Figure 3:
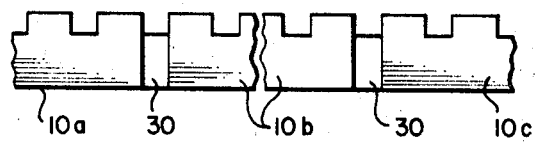
FIG. 3 is a fragmentary view similar to FIG. 1 but illustrating a composite block differentially heated.

Although the incubation appartus has been shown as having only one block, it will be appreciated that the block could, as shown in FIG. 3, be in shorter sections 10a 10b, 10c, put together to provide an elongated composite block of shorter sections, each shorter block section having its own heater element and maintained at a predetermined desired temperature to the end that, at first, the sample may be subjected to a higher temperature by section 10a in order to bring it up to incubating temperature quickly, then passing it on to section 10b which is maintained at the incubation temperature. Furthermore, if it is desired to cool the sample during the latter stages of incubation, the last block section 10c in the apparatus may be provided with means to cool the section and thereby cool the sample in the cup engaged thereby. Insulation 30, as necessary, may be provided between the block sections.

Figure 4:
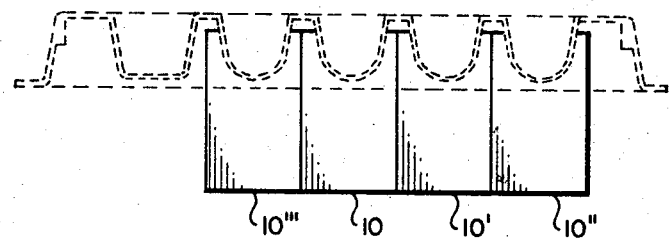
FIG. 4 is a view similar to FIG. 2 but showing an arrangement for simultaneously incubating the contents of several cups of the capsule.

Moreover, although the incubation apparatus is shown as engaging only one of the cups in the capsules, it is understood that, as shown in FIG. 4, several blocks 10′, 10″, 10‴, could be mounted adjacent block 10 side by side, insulated from each other if necessary, in order that several cups in an individual capsule may be heated in order to incubate samples therein.

There has thus been provided an incubation apparatus which is simple and economical in construction and operates in a reliable and facile manner for maintaining a sample in a capsule cup at any desired temperature.

Although the present invention has been described in detail in connection with several illustrative embodiments, it should be understood that the novelty of the invention is not limited to the specific embodiments illustrated and described but is defined only by the scope of the appended claims.

What is claimed is:

1. An incubation apparatus for use in an automated chemical analyzer processing sample capsules having at least one cup therein the contents of which are to be incubated, said apparatus comprising, in combination:
   an elongated structure having a set of toothlike projections, each projection providing a heat exchange station; and
   means periodically placing one of said heat exchange stations and said capsule cup in engagement with each other for a predetermined heat exchange dwell period.

2. The apparatus of claim 1 wherein:
   each said projection has a recess in which said capsule cup fits snugly.

3. An incubation apparatus for use in an automated chemical analyzer processing discrete sample capsules each having at least one cup therein the contents of which are to be incubated, said apparatus comprising, in combination:
   transport means for progressively advancing one of said capsules to different spaced positions along a path;
   a structure having a plurality of heat exchange stations extending in generally the same direction as said path, said stations being spaced apart a distance corresponding to the spacing between said positions; and
   means for shifting said structure and transport means relative to one another when said capsule is located in any one of said positions so as to bring said capsule cup into engagement with one of said heat exchange stations for a predetermined heat exchange dwell period.

4. The apparatus of claim 3 wherein:
   said structure is located below said transport means; and
   said shifting means vertically reciprocates said structure in timed relation to the advancement of said capsule by said transport means.

5. The apparatus of claim 3 wherein:
   said structure is formed with a plurality of spaced toothlike projections; and
   said heat exchange stations comprise recesses formed in said projections and generally conforming to the outside surface of said capsule cup.

6. An incubation apparatus for use in an automated chemical analyzer processing discrete sample capsules each having at least one cup therein the contents of which are to be incubated, said apparatus comprising, in combination:
   a structure provided with a plurality of spaced heat exchange stations;
   means for progressively advancing said capsule cup in stepwise fashion to positions adjacent to said stations; and
   means for placing said capsule cup in engagement with each of said heat exchange stations as said cup is positioned adjacent thereto by said advancing means.

7. The apparatus of claim 6 including:
   means for differentially heating said structure, said heating means maintaining the first several of said heat exchange stations at a temperature above that necessary for incubation of the contents of the capsule cup in order that the cup contents may be brought up to said incubation temperature quickly; and
   said heating means maintaining the remainder of the heat exchange stations at said incubation temperature.

8. The apparatus of claim 7 wherein:
   said heating means maintains the last several heat exchange stations of said remainder at a temperature below said incubation temperature for cooling said capsule cup contents.

References Cited

UNITED STATES PATENTS

| | | | |
|---|---|---|---|
| 3,128,239 | 4/1964 | Page | 195—103.5X |
| 3,260,413 | 7/1966 | Natelson | 23—253X |
| 3,271,112 | 9/1966 | Williams et al. | 23—253 |

MORRIS O. WOLK, Primary Examiner

R. E. SERWIN, Assistant Examiner

U.S. Cl. X.R.

23—259; 119—36; 195—139